(12) United States Patent
Takemura et al.

(10) Patent No.: US 7,194,591 B2
(45) Date of Patent: Mar. 20, 2007

(54) DATA COMMUNICATION APPARATUS AND METHOD FOR MANAGING MEMORY IN THE SAME

(75) Inventors: Toshiharu Takemura, Tokyo (JP); Tadashi Morita, Tokyo (JP); Fumio Kubono, Tokyo (JP); Taro Kurita, Tokyo (JP); Takuya Ichikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 377 days.

(21) Appl. No.: 10/809,363

(22) Filed: Mar. 26, 2004

(65) Prior Publication Data
US 2004/0250037 A1   Dec. 9, 2004

(30) Foreign Application Priority Data
Apr. 9, 2003   (JP) .............................. 2003-104706

(51) Int. Cl.
*G06F 12/14*   (2006.01)
(52) U.S. Cl. ................ 711/164; 711/147; 711/148; 711/151; 711/152; 711/154; 711/170; 726/6; 726/7; 726/8; 726/27; 726/28; 726/29; 726/30; 726/18; 726/19; 380/258; 380/264
(58) Field of Classification Search ............... 711/147, 711/148, 151, 152, 154, 164, 170; 726/6, 726/7, 8, 18, 19, 27, 28, 29, 30; 380/258, 380/264
See application file for complete search history.

(56) References Cited

U.S. PATENT DOCUMENTS

| 4,816,654 | A  |   | 3/1989  | Anderl et al. |
| 6,094,724 | A  |   | 7/2000  | Benhammou et al. |
| 6,581,162 | B1 | * | 6/2003  | Angelo et al. .............. 713/193 |
| 6,934,817 | B2 | * | 8/2005  | Ellison et al. .............. 711/153 |
| 2003/0212895 | A1 | * | 11/2003 | Kisliakov ................... 713/185 |

FOREIGN PATENT DOCUMENTS

| DE | 195 36 206 | 4/1996 |
| EP | 0 583 006  | 2/1994 |
| EP | 1 019 817  | 7/2000 |
| EP | 1 160 745  | 12/2001 |

* cited by examiner

*Primary Examiner*—Stephen C. Elmore
*Assistant Examiner*—Daniel Kim
(74) *Attorney, Agent, or Firm*—Oblon, Spivak, McClelland, Maier & Neustadt, P.C.

(57) ABSTRACT

A plurality of services are defined for one service memory field (overlap service), and a plurality of access methods, such as "only read" and "read/write", are set in the service memory field. When an overlap service is defined, a PIN code may be set to each service. For example, when two services "read" and "read/write" can be started corresponding to a service memory field, two PIN codes are set.

12 Claims, 15 Drawing Sheets

PIN-CODE SERVICE DATA BLOCK

START BIT — 1-BYTE DATA — STOP BIT

DATA COMMUNICATION APPARATUS AND METHOD FOR MANAGING MEMORY IN THE SAME

BACKGROUND OF THE INVENTION

1. Field of the Invention

The present invention relates to a data communication apparatus including relatively large memory space and a method for managing the memory in the same. In particular, the present invention relates to a data communication apparatus including memory space in which one or more applications are allocated and a method for managing the memory in the same.

More specifically, the present invention relates to a data communication apparatus in which an access right is managed and restricted for each of applications allocated in memory space and a method for managing the memory in the same. In particular, the present invention relates to a data communication apparatus for providing a plurality of access methods to each service memory field allocated to an application and a method for managing the memory in the same.

2. Description of the Related Art

Contactless IC cards can be used as wireless communication units which can be applied only locally.

This type of wireless communication is generally realized based on the principle of electromagnetic induction. That is, this system includes an IC card having a memory function and a card reader/writer for reading/writing data from/in the memory of the IC card. A loop coil in the IC card, which serves as a primary coil, and an antenna in the card reader/writer, which serves as a secondary coil, form a transformer system. In this system, the card reader/writer transmits power and information by electromagnetic induction to the IC card, so that the IC card is driven by the supplied power so as to respond to a question signal from the card reader/writer.

When the card reader/writer modulates a current flowing through the antenna, an induced voltage in the loop coil of the IC card is modulated. Accordingly, the card reader/writer can transmit data to the IC card. On the other hand, variation in the load between terminals of the loop coil of the IC card causes change in the impedance between antenna terminals of the IC card reader/writer, so that a current and voltage in the antenna changes. Accordingly, the IC card responds to the card reader/writer.

Contactless proximity communication system typified by IC cards has become widespread for its simple operation. For example, by storing personal authentication information such as a PIN code and valuable information such as a electronic ticket in an IC card, a card reader/writer provided in a cash dispenser, or at an entrance/exit of a concert hall or a ticket gate in a station can access the IC card put by a user in a contactless manner, so as to perform an authentication process.

Recently, IC cards having relatively large memory space have been emerged with an improvement in a miniaturization technique. An IC card including a large memory can store a plurality of applications therein, and thus the single IC card can be used for a plurality of uses. For example, by storing many applications, such as electronic money used for electronic payment and an electronic ticket for a specific concert hall, in an IC card, the IC card can be applied to various uses. Herein, the electronic money and electronic ticket mean a system of making settlement (electronic payment) through electronic data issued according to money provided by a user, or the electronic data itself.

Further, by providing a wired interface (not shown) for connecting to an external apparatus as well as a wireless contactless interface in the IC card or the card reader/writer, any one of or both of functions of the IC card and the card reader/writer can be provided in a device, such as a mobile phone, a personal digital assistant (PDA), or a personal computer.

In this case, the IC card technique can be used as a multi-purpose bidirectional proximity communication interface. For example, when a proximity communication system is realized by computers or information appliances, one-to-one communication is performed. Alternatively, an apparatus can communicate with another device, such as a contactless IC card. In that case, the apparatus may communicate with a plurality of cards.

Various applications using an IC card, such as transmission/reception of electronic valuable information including electronic money to/from an external apparatus, can be performed in an information processing terminal. For example, user interaction with an IC card can be performed in the information processing terminal by using a user interface in the information processing terminal, such as a keyboard and display. When the IC card is connected to a mobile phone, data stored in the IC card can be transmitted through a telephone network. Further, by connecting the mobile phone to the Internet, charges for usage can be paid by using the IC card.

An IC card is usually used by putting it over a card reader/writer. The card reader/writer constantly polls IC cards, and when the card reader/writer detects an external IC card, communication between them starts.

In this case, a personal identification number (PIN) is already input to the IC card reader/writer by the user. The input PIN is compared with a PIN stored in the IC card, so that identification or authentication is performed between the IC card and the IC card reader/writer (PIN is a code used for accessing the IC card). When the identification or authentication is successfully done, the user can use an application stored in the IC card, that is the user can access a service memory field allocated to the application (in this specification, a memory field allocated to an application is called a "service memory field"). Access to a service memory field is adequately performed by encryption communication in accordance with the security level of the application.

In this specification, use of an application, that is, a process of accessing a corresponding service memory field, is called a "service". The service includes reading/writing of data from/in a memory, and addition/subtraction of value to/from valuable information such as electronic money.

As described above, when one IC card is used for a plurality of applications, an access right must be controlled for each application. In order to control access, a PIN code is allocated for each application, so that verification is performed in units of applications.

The types of services which can be applied to each application vary depending on attribute information of the application, such as a characteristic and a required security level of the application. Other than that, there is a requirement for controlling a service according to an access right allocated to each user of the application. For example, a requirement for discrimination of users: a full-access to a service memory field can be allowed to user A, but user B is allowed to perform only a reading operation.

However, this method of controlling access simply by allocating a PIN code to each application causes inconvenience. That is, after passing through a verification process by using a PIN code, anyone can uniformly use a service defined by the application. In other words, even if a right for using an application should be changed depending on users so as to discriminate users (available service differs depending on users: someone is allowed to read/write data from/in a service memory field, and another is only allowed to read data), a uniform service is provided to every user.

SUMMARY OF THE INVENTION

An object of the present invention is to provide an excellent data communication apparatus including memory space in which one or more applications are allocated, and a method for managing the memory in the same, in which a different access right is given to each user for each service memory field allocated to each application, so that a plurality of access methods can be provided.

The present invention has been made in view of the above-described problems. According to a first aspect of the present invention, a data communication apparatus includes memory space; a service defining unit for defining, in the memory space, a service and a service memory field to which the service is applied; and a PIN-code service defining unit for defining a PIN-code service which verifies a PIN code before performing the service.

According to a second aspect of the present invention, a method for managing a memory in a data communication apparatus including memory space is provided. The method includes a service defining step of defining, in the memory space, a service and a service memory field to which the service is applied; and a PIN-code service defining step of defining a PIN-code service which verifies a PIN code before performing the service.

Herein, the data communication apparatus is a contactless IC card including an IC chip having a wireless communication unit, a data transmission/reception function, and a data processing unit; a contact IC card including a terminal at its surface; or an information communication terminal, such as a mobile phone, a personal handyphone system (PHS), or a personal digital assistance (PDA), which includes an IC chip having the same function as that of the contact/contactless IC card. The data communication apparatus includes a memory region having a data accumulation memory, such as EEPROM; a data processing unit; and a data communication function. When a mobile phone or the like is applied, an external storage medium, such as an IC card including an IC chip, may be removably attached thereto. Also, a subscriber identity module (SIM) function, in which contractant information issued by a mobile phone company is recorded, may be mounted on the IC chip. The data communication apparatus may perform data communication through an information communication network, such as the Internet, or directly with an external terminal in a wired or wireless manner.

According to the present invention, a service and a service memory field to which the service is applied are defined in the memory space, and a PIN-code service which verifies a PIN code before performing the service is defined. With this arrangement, the security of the IC card can be ensured.

An area including one or more service memory fields provided in the memory space may be defined. Also, a PIN-code service which verifies a PIN code before accessing the area may be defined.

With this configuration, a PIN code can be set for each service memory field and for each area. Therefore, an access right to the memory space can be hierarchically controlled. When a common PIN code is to be set to a plurality of services, an area including the services is generated, so that a common PIN-code service may be applied to this area.

For example, by inputting a PIN code corresponding to a certain area, the user can obtain an access right to all the service memory fields in the area (and sub-areas) through verification and authentication processes. Therefore, simply by inputting a PIN code corresponding to a desired area, the user can obtain an access right to all the applications used in a series of transactions, and thus access control can be performed efficiently and the apparatus can be used more easily.

Further, an overlap-service for defining another service applied to the service memory field which has already been provided may be defined.

By defining the overlap service, a plurality of access methods, such as "only read" and "read/write" can be set to a service memory field.

When the overlap service is defined, a PIN code may be set to each service. For example, when two services "read" and "read/write" correspond to a service memory field, two PIN codes are set. Likewise, different PIN codes are set for "addition" and "subtraction" to/from valuable information including electronic money. Further, restriction may be put so that a PIN code must be input in order to write information in a memory field but a PIN code need not be input in order to read information from the memory field.

Verification can be controlled so as to set verification of PIN code performed by the PIN-code service to effective or ineffective.

With this configuration, a PIN code must be verified before starting a service or accessing an area only when the PIN-code service corresponding to the service or area is effective, and a PIN code need not be verified when the PIN-code service is ineffective.

As described above, the present invention can provide an excellent data communication apparatus including memory space in which one or more applications are allocated, and a method for managing the memory in the same, in which a different access right is given to each user for each service memory field allocated to each application, so that a plurality of access methods can be provided.

According to the present invention, even when an access right to a memory field in the IC card is not single, a PIN code can be set according to each access right. That is, in each service memory field, a PIN code is set for each service to be applied. For example, restriction may be put so that a PIN code must be input in order to write information in a memory field but a PIN code need not be input in order to read information from the memory field.

Further objects, features, and advantages of the present invention will become apparent from the following description of the preferred embodiment with reference to the attached drawings.

DESCRIPTION OF THE PREFERRED EMBODIMENT

Hereinafter, an embodiment of the present invention will be described with reference to the drawings.

A. Contactless Communication System

The present invention relates to a contactless data communication system using an IC card. This type of contactless data communication system is typically realized based on the principle of electromagnetic induction. That is, the system includes an IC card having a memory function and a card reader/writer for reading/writing data from/in the memory of the IC card. A loop coil of the IC card serving as a primary coil and an antenna of the card reader/writer serving as a secondary coil form a transformer system. The card reader/writer transmits power and information to the IC card by electromagnetic induction so as to transmit a question signal thereto. The IC card is driven by the supplied power, and changes a load between terminals of the loop coil in accordance with a response signal to the question signal. Accordingly, the IC card modulates the amplitude of a signal appeared in a reception circuit of the reader/writer, so that communication can be performed therebetween. The IC card may be a card-type data communication apparatus. Alternatively, an IC chip having a so-called IC card function may be incorporated into an information communication terminal, such as a mobile phone (in both cases where the IC card is incorporated into an apparatus and where the IC card is removably attached to an apparatus, it may be called an "IC card" for convenience in this specification). The IC chip having an IC card function is mounted on a mobile terminal, such as a mobile phone or PDA, or on an information processing terminal, such as a personal computer (PC), so as to perform data communication with an external apparatus. In that case, the IC chip includes an interface used for connecting to an external apparatus, in addition to an interface used for connecting to the reader/writer in a wired or wireless manner.

Figure 1:
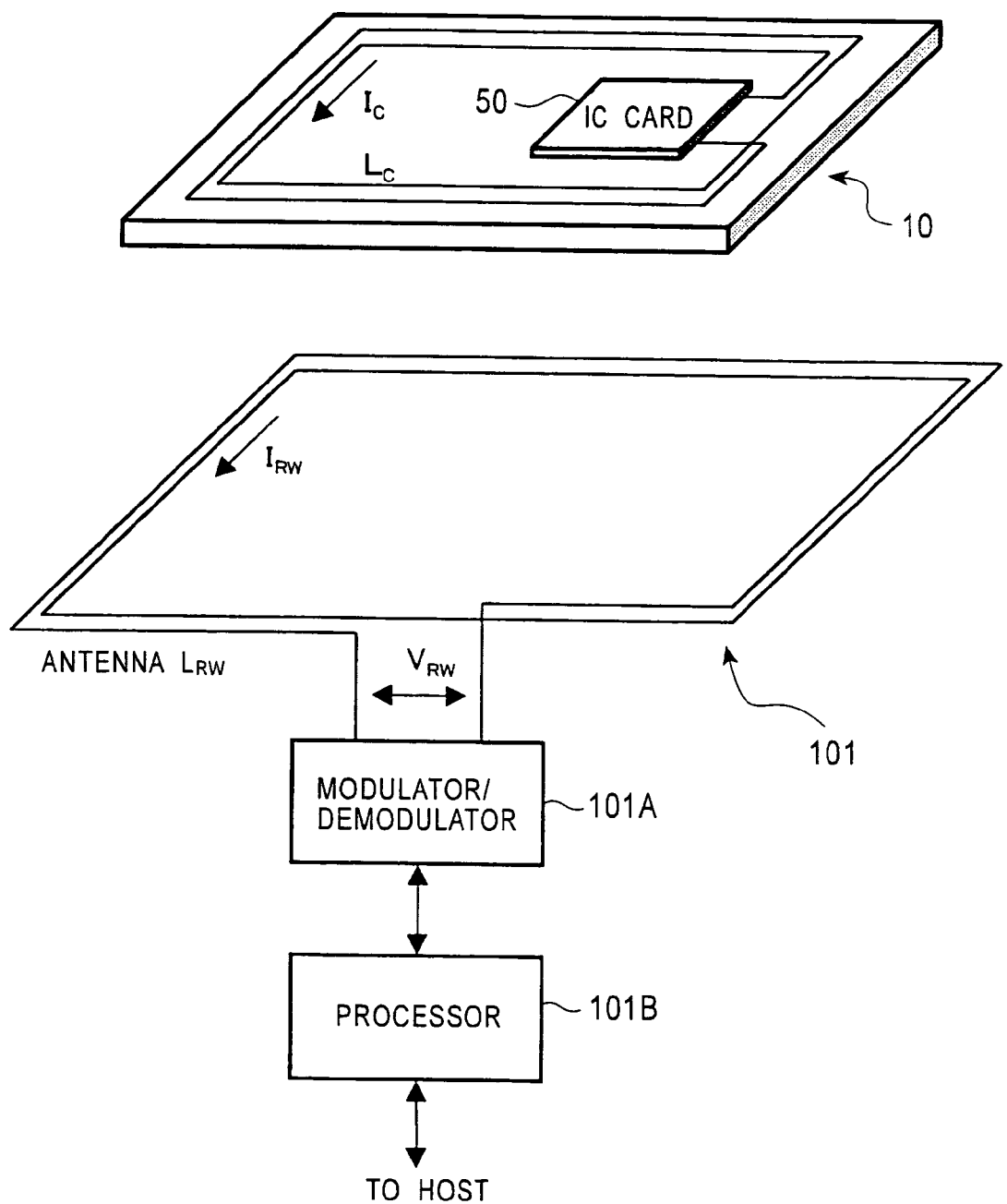
FIG. 1 illustrates a wireless communication system based on electromagnetic induction including a reader/writer 101 and an IC card 50.

FIG. 1 is a conceptual diagram showing a wireless communication system based on electromagnetic induction including a reader/writer 101 and an IC card 50. The reader/writer 101 includes an antenna $L_{RW}$ including a loop coil. By applying a current $I_{RW}$ to the antenna $L_{RW}$, a magnetic field is generated around the antenna $L_{RW}$. On the other hand, a loop coil $L_C$ is provided around the IC card 50. An induced voltage, which is caused by the magnetic field generated by the loop antenna $L_{RW}$ of the reader/writer 101, is generated at the ends of the loop coil $L_C$ of the IC card 50, and the induced voltage is input to a terminal of the IC card 50, which is connected to the ends of the loop coil $L_C$.

Figure 2:
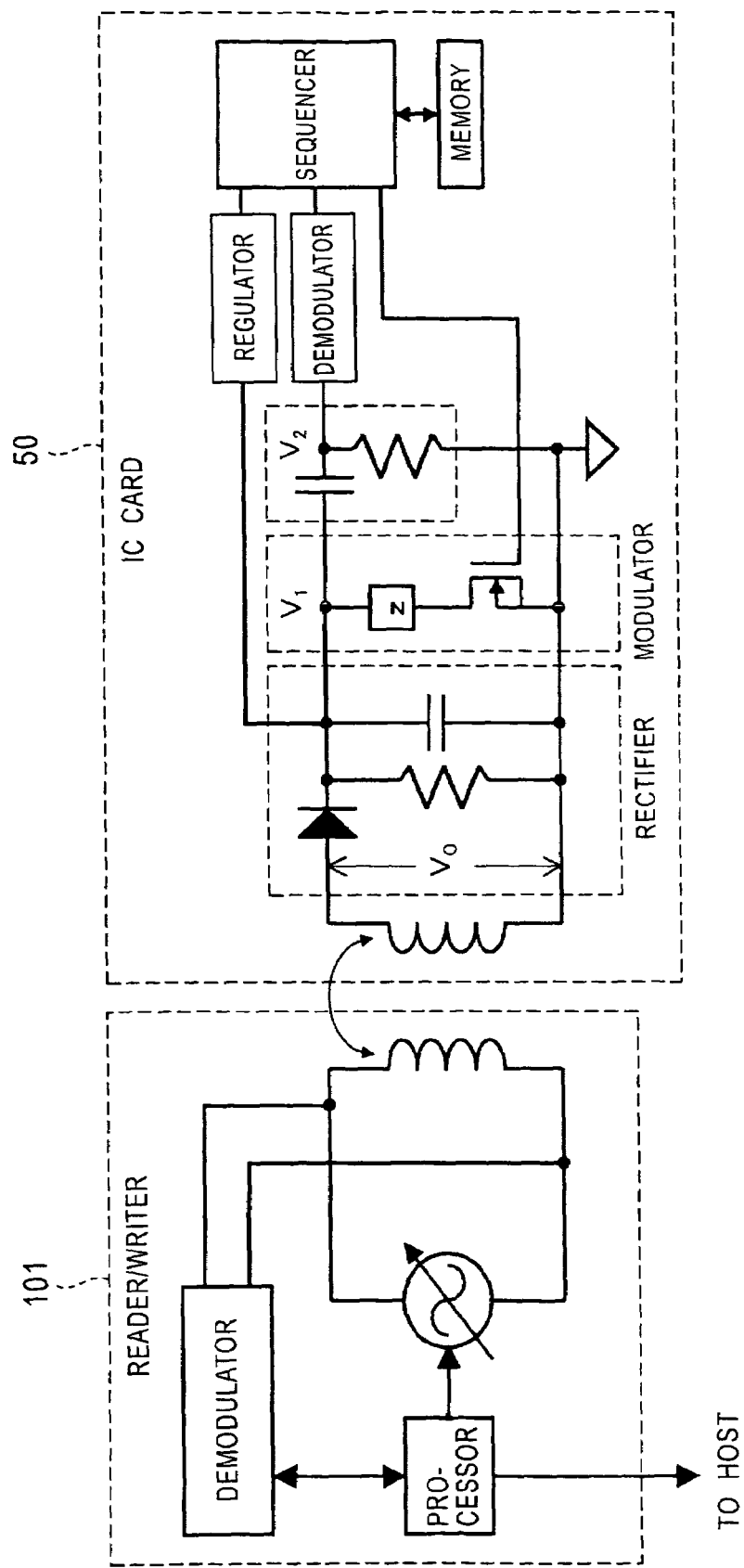
FIG. 2 is a modeled diagram showing a transformer system including the reader/writer 101 and the IC card 50.

The degree of coupling between the antenna $L_{RW}$ of the reader/writer 101 and the loop coil $L_C$ of the IC card 50 changes depending on their positions. However, it can be regarded that the antenna $L_{RW}$ and the loop coil $L_C$ form a transformer system, which can be modeled as shown in FIG. 2.

When the reader/writer 101 modulates the current $I_{RW}$ flowing through the antenna $L_{RW}$, a voltage $V_0$ induced to the loop coil $L_C$ of the IC card 50 is modulated. Accordingly, the reader/writer 101 can transmit data to the IC card 50. The transmitted data includes a PIN code required for obtaining an access right to an application or area, such as a personal identification number (PIN) and a password input by a user to an external apparatus connected to the reader/writer 101, and valuable information provided by an application, such as electronic money and electronic ticket.

Also, the IC card 50 includes a function of varying a load between the terminals of the loop coil $L_C$ in accordance with data to be transmitted to the reader/writer 101 (load switching). When the load between the terminals of the loop coil $L_C$ varies, impedance between the terminals of the antenna $L_{RW}$ of the reader/writer 101 changes, so that the current $I_{RW}$ flowing through the antenna $L_{RW}$ and a voltage $V_{RW}$ vary. By demodulating the variation components, the reader/writer 101 can receive the data transmitted from the IC card 50. The data received by the reader/writer 101 from the IC card 50 includes valuable information provided by an application, such as electronic money and electronic ticket.

B. Configuration of Memory Space in IC Card

One or more applications are allocated in memory space in the IC card 50, which is incorporated into a mobile terminal 10. The applications include transmission/reception of electronic valuable information to/from an external apparatus, such as electronic payment. A memory field allocated to each application is called a "service memory field". An operation of using an application, that is, accessing a corresponding service memory field, is called a "service". The service includes reading/writing data from/in the memory and addition/subtraction of value to/from valuable information including electronic money.

In order to restrict use of an application or startup of a service in accordance with whether a user has an access right, a PIN code is allocated to each application, so that the PIN code is verified when a corresponding service is performed. Further, in access to each service memory field, encryption communication is adequately performed in accordance with the security level or the like of a corresponding application.

In the embodiment, a hierarchical structure similar to a "directory" is introduced to the memory space in the IC card 50. Accordingly, each application allocated to a memory field can be registered in an "area" in a desired layer. For example, by registering a plurality of applications used in a series of transactions or applications closely related to each other in service memory fields in the same area (further, by registering areas closely related to each other in the same parent area), the applications in the memory fields and the areas can be systematically arranged, so that the user can efficiently sort and arrange the applications.

In order to hierarchically control an access right to each memory field, a PIN code can be set to each area, in addition to each application. For example, by inputting a PIN code corresponding to a certain area, the user can obtain an access right to all applications in the area (and sub-areas) through verification and authentication processes. Therefore, by inputting a PIN code corresponding to a desired area only once, the user can obtain an access right to all the applications used in a series of transactions. Accordingly, efficiency in access control can be enhanced and the apparatus can be used more easily.

The embodiment also has the following features. That is, an access right to a certain service memory field may not be single, but a PIN code can be set for each access right, that is, for each service conducted in a service memory field. For example, when two services "read" and "read/write" correspond to one service memory field, two PIN codes are set. Likewise, different PIN codes are set for "addition" and "subtraction" to/from valuable information including electronic money. Alternatively, restriction may be put so that a PIN code must be input in order to write information in a memory field but a PIN code need not be input in order to read information from the memory field. Setting of a PIN code for each applied service will be described later.

Figure 3:
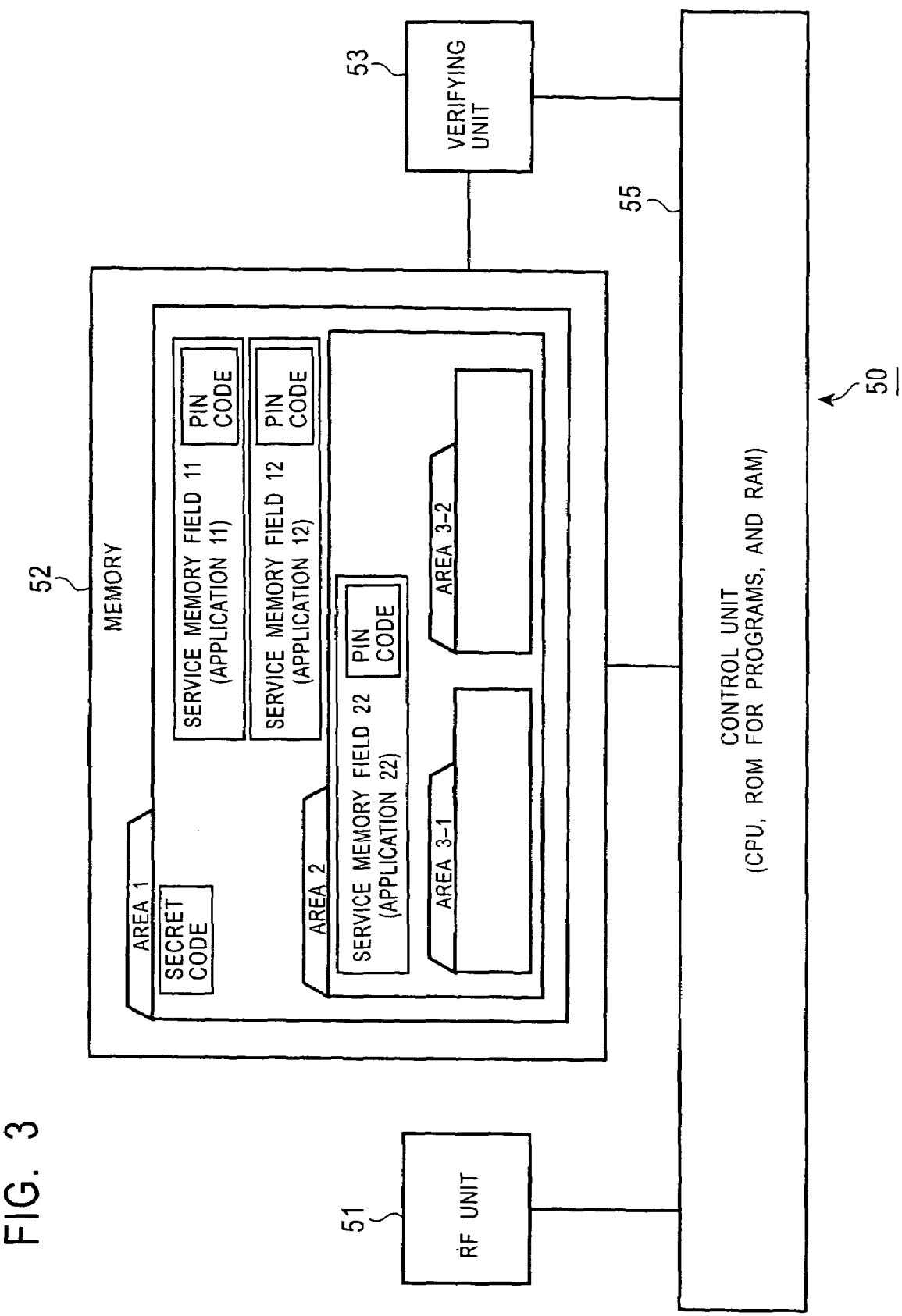
FIG. 3 shows a functional structure of the IC card 50.

FIG. 3 shows a functional structure of the IC card 50 according to the embodiment. As shown in FIG. 3, the IC card 50 includes an RF unit 51, which is connected to the antenna used for performing radio communication with the reader/writer 101; a memory 52 (described above) including service memory fields allocated to corresponding applications; a verifying unit 53 for verifying a PIN code input through the RF unit 51; and a control unit 55 for controlling these units.

The control unit 55 includes a central processing unit (CPU), a read-only memory (ROM), and a random-access memory (RAM). The control unit 55 controls operations in the IC card 50 by executing program codes stored in the ROM.

The memory 52 is used for allocating a storage field to each of one or more applications. Also, the memory 52 is not limited to a specific device, but may be any types of readable and writable storage medium, such as a semiconductor memory and a magnetic stripe.

In the embodiment, a hierarchical structure similar to a "directory" is introduced to the storage space in the memory 52. Therefore, each application allocated to a memory field can be registered as a service memory field in an area of a desired layer. For example, applications closely related to each other, such as applications used for a series of transactions, can be registered in the same area (further, areas closely related to each other can be registered in the same parent area).

Further, each of the applications (service memory fields) allocated in the memory 52 and the areas includes a PIN-code definition block. With this configuration, a PIN code can be set for each application or each area. Therefore, access to the memory 52 can be performed in units of applications and units of areas.

An access right to each service memory field may not be single, but a PIN code can be set for each service. For example, when two services "read" and "read/write" correspond to one service memory field, two PIN codes are set. Likewise, different PIN codes are set for "addition" and "subtraction" to/from valuable information including electronic money (described later).

The verifying unit 53 compares a PIN code transmitted through the RF unit 51 with the PIN code set in each of the applications, areas allocated in the directory, or the service memory fields, so as to permit access to a corresponding memory field. The reader/writer 101 can read/write information from/in the accessible memory field through the RF unit 51.

C. Application of PIN Code

As described above, the memory 52 in the IC card 50 includes various service memory fields allocated to various applications. In addition, one or more applicable services are provided to each service memory field. In the embodiment, access may be restricted in units of areas and applications. In addition, a PIN code may be set for each type of service applied to each application so as to restrict access in units of services.

Figure 4:
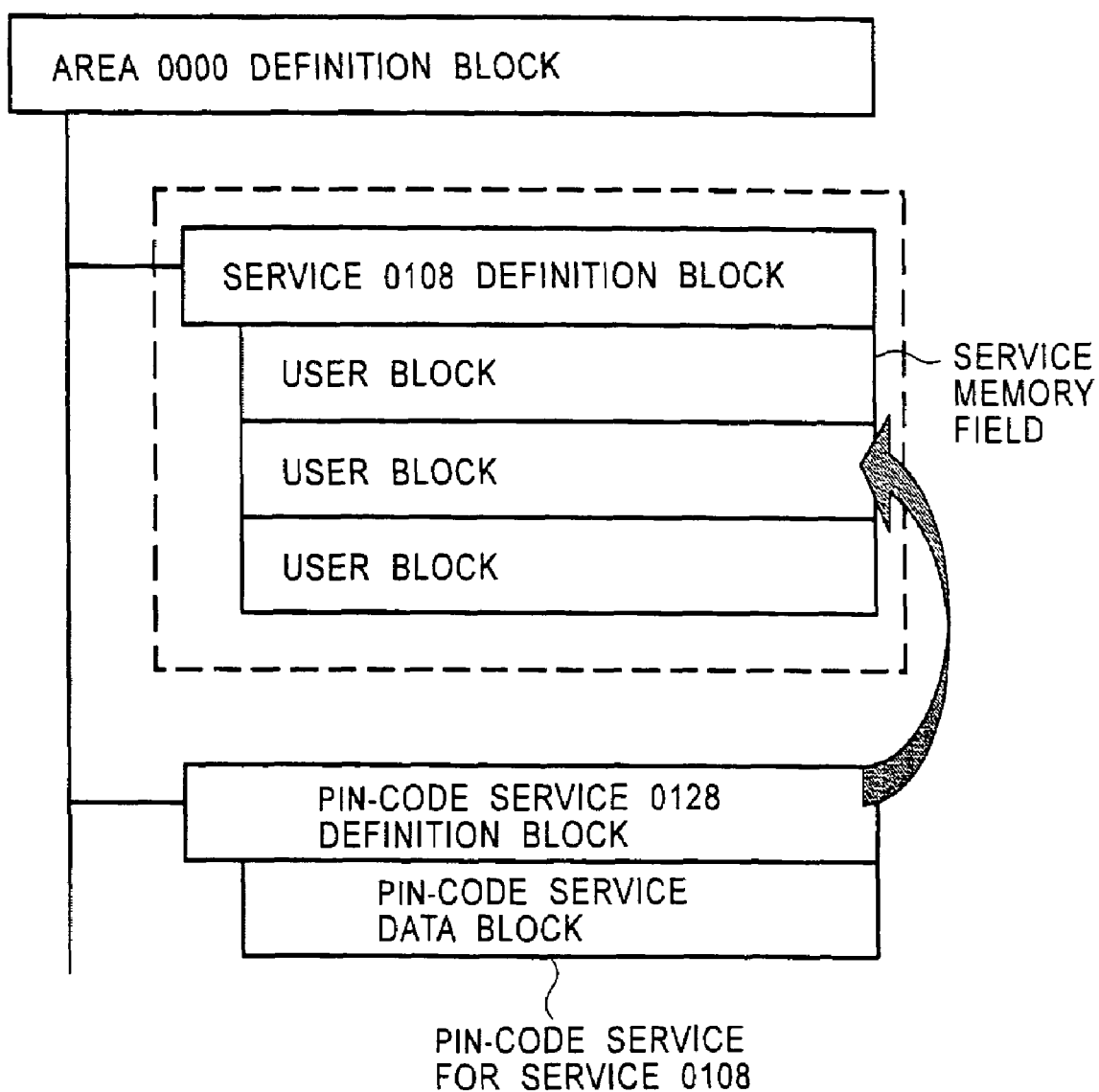
FIG. 4 illustrates a system for applying a PIN code to a service.

FIG. 4 shows a basic structure of the memory space in the IC card 50. As described above with reference to FIG. 3, a hierarchical structure similar to a "directory" is introduced to the memory space in the IC card 50, so that each service memory field allocated to an application can be registered in an area in a desired layer. In the example shown in FIG. 4, one service memory field is registered in an area 0000 defined by an area 0000 definition block.

The service memory field shown in the figure includes one or more user blocks. The user block is a minimum data unit in which an access operation is ensured. One service defined by a service 0108 definition block, that is, a service 0108, can be applied to this service memory field.

In the embodiment, access can be restricted in units of areas and applications. Additionally, a PIN code may be set for each type of services, so that access can be restricted in unit of services. PIN-code setting information related to a service in which access is restricted is defined as a service dedicated to a PIN code (that is, "PIN-code service").

In the example shown in FIG. 4, a PIN code related to the service 0108 is defined as a PIN-code service 0128 definition block. Contents of the PIN-code service are stored in a PIN-code service data block.

When the PIN-code service to the service 0108 is effective, verification of the PIN code must be performed by using the PIN-code service 0128 before starting the service 0108 so as to read/write information from/in its user block. More specifically, when an encryption read/write command is used, the PIN code for the service 0108 is verified before mutual authentication. (A mechanism of setting the PIN-code service to effective/ineffective will be described later.)

In the embodiment, each service memory field allocated to an application can be registered in an area in a desired layer and areas can be hierarchically arranged (areas closely related to each other can be registered in the same parent area). In that case, by setting a PIN code for each area, access can be restricted in units of areas.

Figure 5:
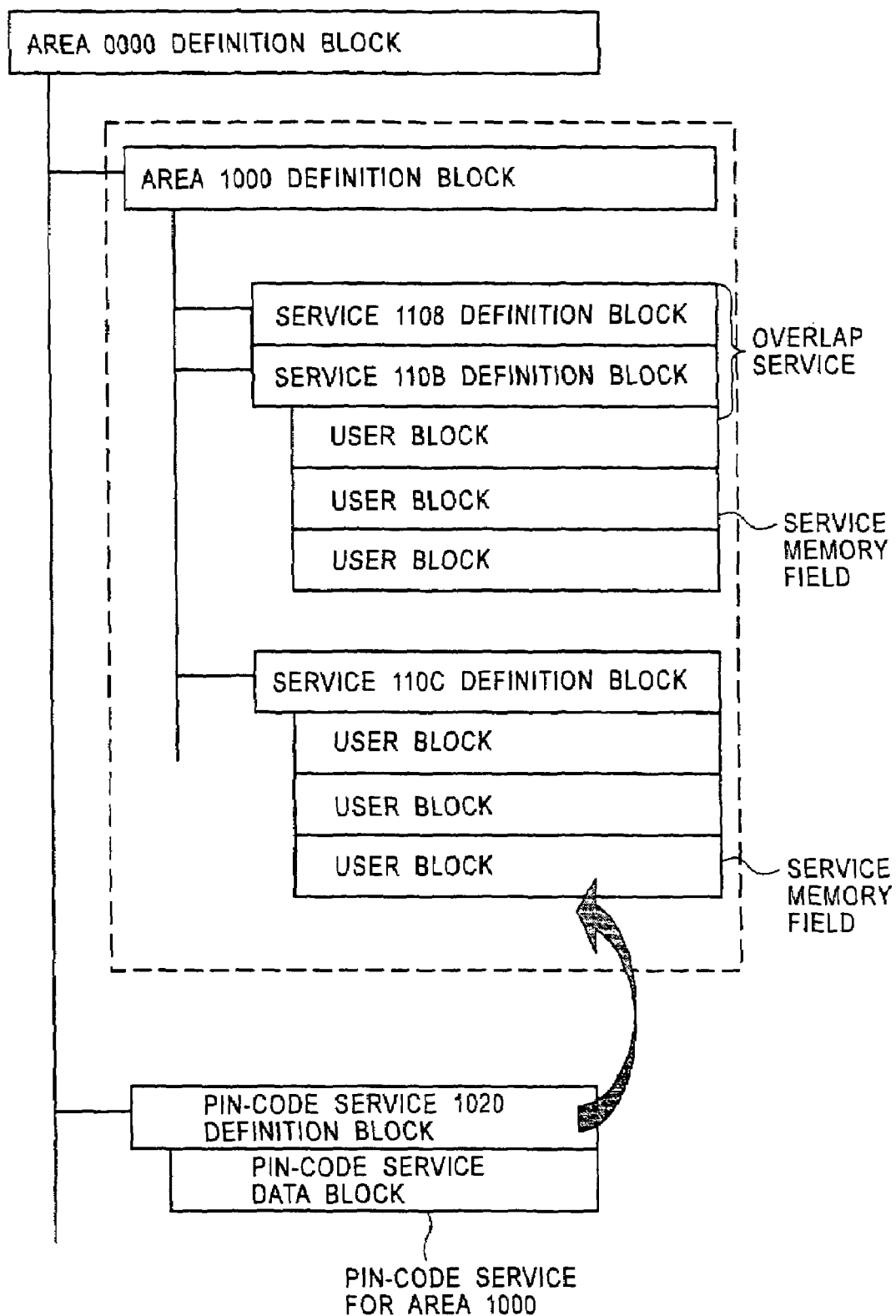
FIG. 5 illustrates a system for applying a PIN code to an area.

FIG. 5 shows a state where areas are hierarchically arranged in the memory space in the IC card 50. In the example shown in FIG. 5, an area 1000 defined by an area 1000 definition block is registered in the area 0000 defined by the area 0000 definition block.

In the example shown in FIG. 5, two service memory fields are registered in the area 1000. A service 1108 defined by a service 1108 definition block and a service 110B defined by a service 110B definition block can be applied to one of the service memory fields. In this way, when a plurality of different services are defined in one service memory field, that is called an "overlap service" in this specification. In the overlap service, a different service is applied according to an input PIN code in the same service memory field.

On the other hand, a service 110C defined by a service 110C definition block can be applied to the other service memory field.

The user can start up a service set in each service memory field so as to read/write information from/in its user block. Of course, as described above with reference to FIG. 4, a PIN code service can be defined for each service. In this case, when the PIN-code service corresponding to a service is effective, the service can be started up after a PIN code is verified by using the PIN-code service.

In order to set a common PIN code to a plurality of services, an area including these services is generated, so that a common PIN-code service can be applied to this area.

In the example shown in FIG. 5, the PIN-code related to the area 1000 is defined as a PIN-code service 1020 definition block. Contents of the PIN-code service are stored in the PIN-code service data block.

When the PIN-code service to the area 1000 is effective (described later), verification of the PIN code is performed by using the PIN-code service 1020, and then each service in the area 1000 can be started up so as to read/write information from/in its user block.

Herein, when a PIN-code service is applied to a service in the area 1000 and when the PIN-code service is effective, verification of a PIN code must be performed by using the PIN-code service before reading/writing information from/in its user block.

As shown in FIGS. 4 and 5, a unique PIN-code service is given to each area and service which is to be a target of verification of PIN code.

D. Registration of PIN-Code Service

A PIN-code service is registered in the IC card 50 by using a registration service command, as in ordinary services.

However, an area or service which is a target of verification of a PIN code must be registered in the IC card 50 before registering a PIN-code service. That is, when any area or service for verification of a PIN code has not been registered, error occurs when a PIN-code service is registered.

Further, in the PIN-code service, the number of PIN-code service data blocks, which correspond to user blocks in ordinary services, is only one. Therefore, error occurs if a value except 1 is set to the number of specified user blocks by a registration service command when a service is registered.

Figure 6:
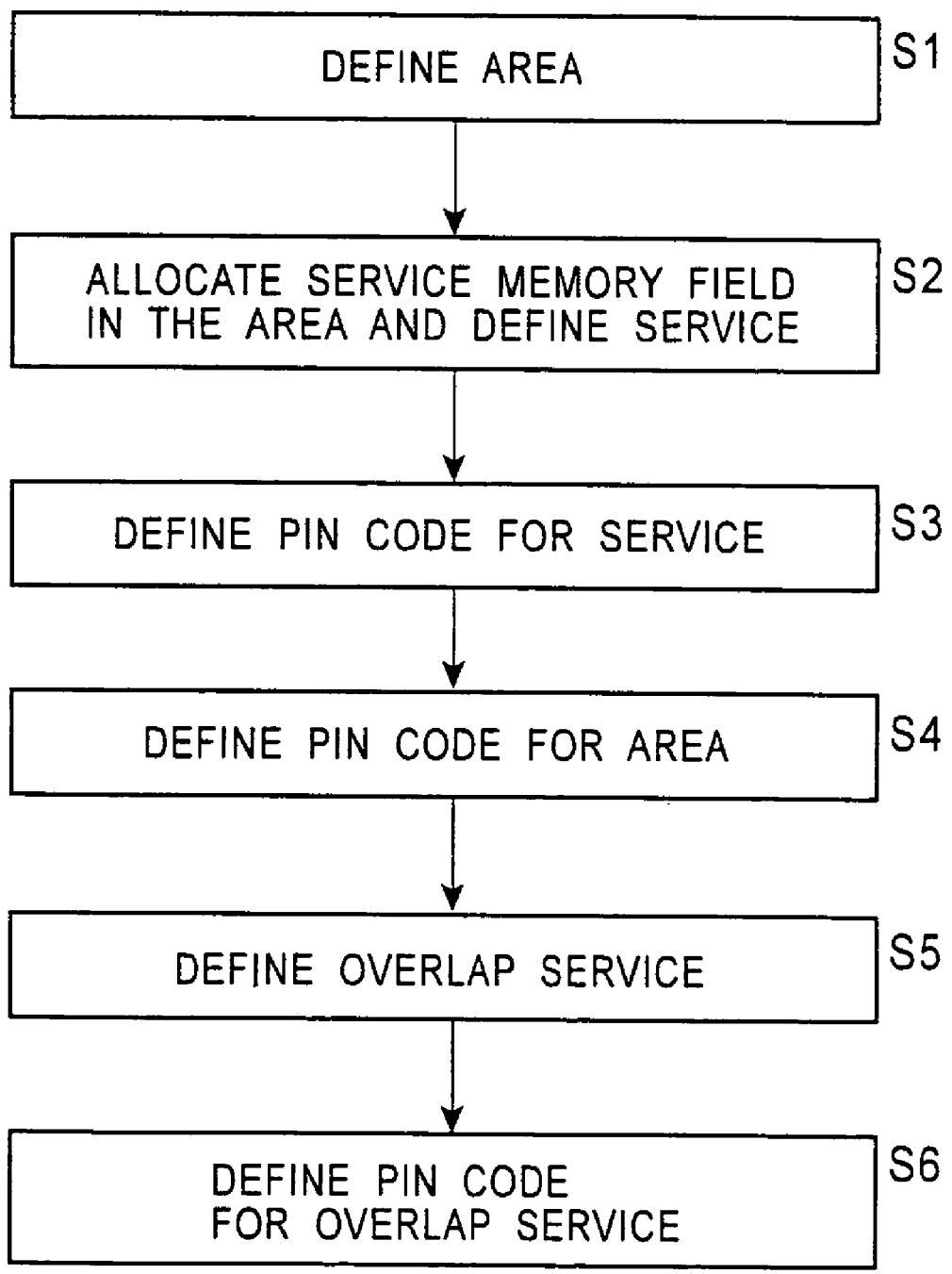
FIG. 6 is a flowchart showing a process of registering an area and service in memory space in the IC card 50.

FIG. 6 is a flowchart showing a process of registering an area or service in the memory space in the IC card 50.

First, an area is defined in the memory space (step S1).

Then, a service memory field is allocated to an application in the area by using a registration service command, and a service applied to this service memory field is defined (step S2). In the registration service command, the number of user blocks in the service memory field is specified. When a plurality of applications are to be allocated in the area, step S2 is repeated.

When a PIN code is to be applied to the service defined in the area, registration of PIN-code service is performed by using a registration service command of the service (step S3).

When a common PIN code is to be set to all the services defined in the area, a common PIN-code service is registered to the area by using a registration service command of the service (step S4).

The order of steps S3 and S4 may be reversed.

Further, when a plurality of different services are to be defined for one service memory field, an overlap service (see FIG. 5) is registered by using a registration service command of the service (step S5).

When a PIN code is to be applied to the overlap service, a PIN-code service is registered by using a registration service command of the service (step S6).

In the example shown in FIG. 4, a service memory field is allocated in the area 0000 of a root and the service 0108 applied thereto is registered, and then a PIN-code service applied to the service 0108 is registered.

In the example shown in FIG. 5, two service memory fields are allocated in the area 1000 under the area 0000 of the root, and the services 1108 and 110C applied thereto respectively are registered. Further, another service 110B is registered as an overlap service in one of the two service memory fields. Although not shown, when PIN codes are to be applied thereto, PIN-code services are registered. When a common PIN code is to be set for the registered services 1108, 110B, and 110C, a common PIN-code service is registered for the area 1000.

E. Application of PIN Code

As shown in FIGS. 4 and 5, by applying PIN codes to the areas and services registered in the memory space in the IC card 50, access control can be performed in units of areas or services. Also, a plurality of services (overlap service) can be registered in one service memory field. In this case, by applying a PIN code to each service, a plurality of access methods can be defined for one service memory field.

Figure 7:
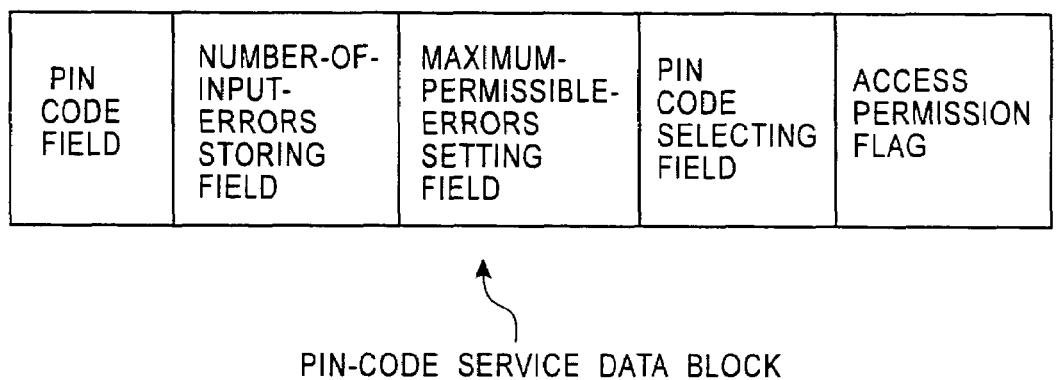
FIG. 7 schematically shows a data structure of a PIN-code service data block.

Contents of application of the PIN code are described in a PIN-code service data block of a PIN-code service definition block. FIG. 7 schematically shows the data structure of the PIN-code service data block. As shown in the figure, the PIN-code service data block includes a PIN code field; a number-of-input-errors storing field; a maximum-permissible-errors setting field; a PIN code selecting field; and an access permission flag.

Only when a PIN code input by a user matches the registered code, the access permission flag in the PIN-code service data block of the corresponding service or area is set, so that access thereto is permitted.

The access permission flag indicates accessible/inaccessible to the corresponding application or directory. When the access permission flag is set, the user can access the corresponding service or area. The access permission flag in a service or area where a PIN code is set indicates "inaccessible" in the default state, but the flag indicates "accessible" after verification of the PIN code and authentication using a secret key have been successfully done. However, if the access permission flag is kept effective and if the IC card 50 or the mobile terminal 10 is lost or stolen, the user may suffer a loss due to use of the service or area without permission or unauthorized access thereto. In order to prevent such a problem, the IC card 50 may have a function of automatically shifting to an inaccessible state when the RF unit 51 determines that it cannot receive radio waves.

When a wrong code is input, the record in the number-of-input-errors storing field is updated. Then, when the number of input errors reaches the maximum permissible errors set in the maximum-permissible-errors setting field, startup of the corresponding service or access to the corresponding area is prohibited.

Generally, the number of input errors should be cleared once input is successfully done. In this way, it can be prevented that a malicious user tries PIN codes one by one. If an authorized user inputs wrong codes by mistake so as to reach the number of maximum permissible errors, an administrator of the IC card 50 may clear the number-of-input-errors storing field. In order to authenticate the administrator, a secret key may be used, as will be described later.

Figure 8:
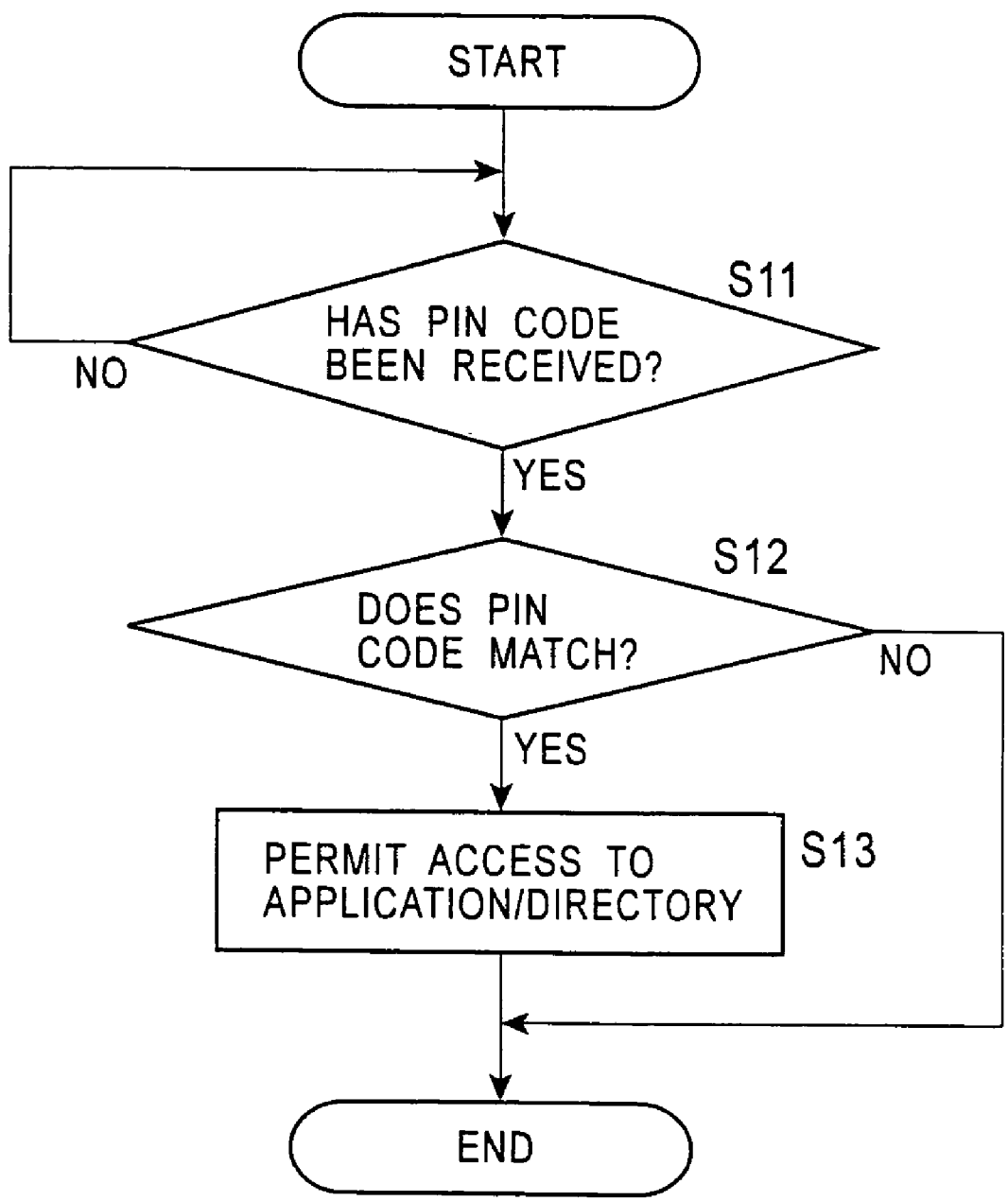
FIG. 8 is a flowchart showing a process of controlling startup of a service or an access right to an area in accordance with a PIN code input by a user.

FIG. 8 is a flowchart showing a process of controlling startup of a service or access to an area in accordance with a PIN code input by a user.

When the user inputs a PIN code (step S11), the verifying unit 53 accesses the PIN-code service data block of each PIN-code service definition block, so as to determine whether the input PIN code matches the PIN code thereof (step S12).

If the PIN code of any PIN-code service data block matches the PIN code input by the user, the access permission flag in the PIN-code service data block is set, so that access to the corresponding service or area is permitted (step S13).

For example, a PIN code, which has been input by using a user interface of an external apparatus (not shown) connected to the reader/writer 101, can be transmitted to the IC card 50 through the RF unit 51 by putting the IC card 50 over the reader/writer 101.

When an access right to an application or directory is controlled by using a PIN code, as shown in FIG. 8, security may be broken if a malicious user tries secret codes one by one (in particular, if the PIN code consists of a small number of digits). Therefore, in the embodiment, the number of maximum permissible inputs is set in the PIN-code definition field. Accordingly, when the number of input errors reaches the maximum, the user cannot access the corresponding application or directory. In this way, access can be controlled.

Figure 9:
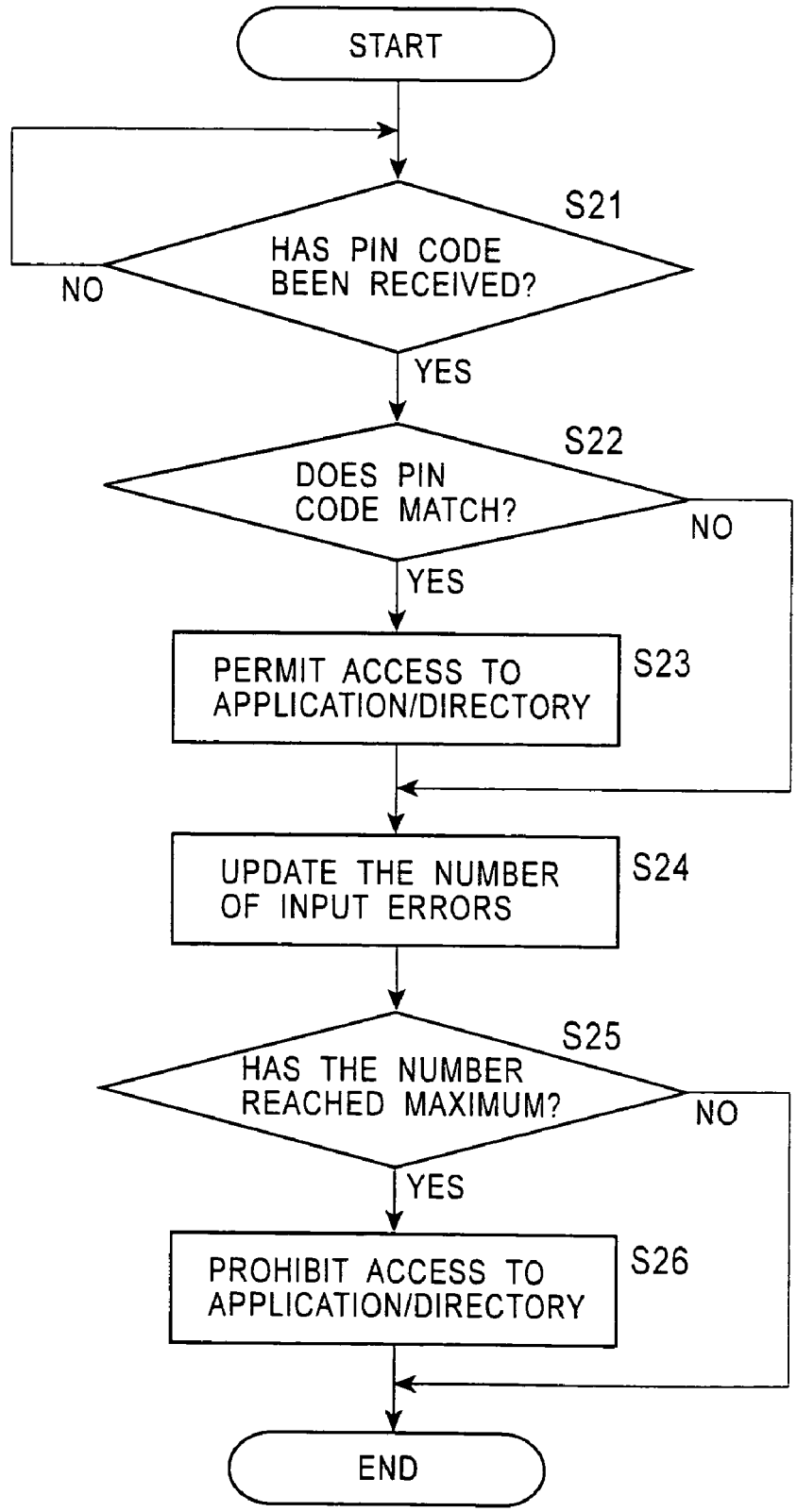
FIG. 9 is a flowchart showing a process of controlling an access right to a service or area based on the number of PIN-code input errors.

FIG. 9 is a flowchart showing a process of controlling an access right to a service or area in accordance with the number of PIN code input errors.

When the user inputs a PIN code (step S21), the verifying unit 53 accesses each PIN-code service definition block, so as to determine whether the input PIN code matches the PIN code thereof (step S22).

If the PIN code of any PIN-code service definition block matches the PIN code input by the user, the access permission flag of the PIN-code service data block is set, so that access to the corresponding service or area is permitted (step S23).

On the other hand, if the PIN code input by the user does not match the PIN code of any PIN-code service definition block, the number of input errors in the PIN-code definition field is updated (step S24). If the PIN code input by the user matches the PIN code of any PIN-code service definition block, so that verification has been successfully done, the number of input errors is cleared, that is, set at 0.

Then, in step S25, it is determined whether the updated number of input errors has reached the maximum permissible errors, which is set in the PIN-code definition field.

If the number of input errors has reached the maximum, the access permission flag in the PIN-code definition field is canceled, so that access to the corresponding service or area is prohibited (step S26). In this way, malicious acts of trying PIN codes by an unauthorized user can be cracked down on.

If the authorized user inputs wrong codes by mistake so as to reach the maximum permissible errors, the administrator of the IC card 50 may clear the number-of-input-errors storing field. In order to authenticate the administrator, a secret key or the like may be used.

F. Control of Comparison/Output of Pin Code

As described above, only when the PIN-code service for a service or area is effective, verification of a PIN code is required before starting up the corresponding service or accessing the corresponding area. That is, verification of a PIN code is not required when the PIN-code service is ineffective.

Hereinafter, control of comparison/output of PIN codes by setting effective/ineffective of a PIN-code service will be described.

Figure 10:
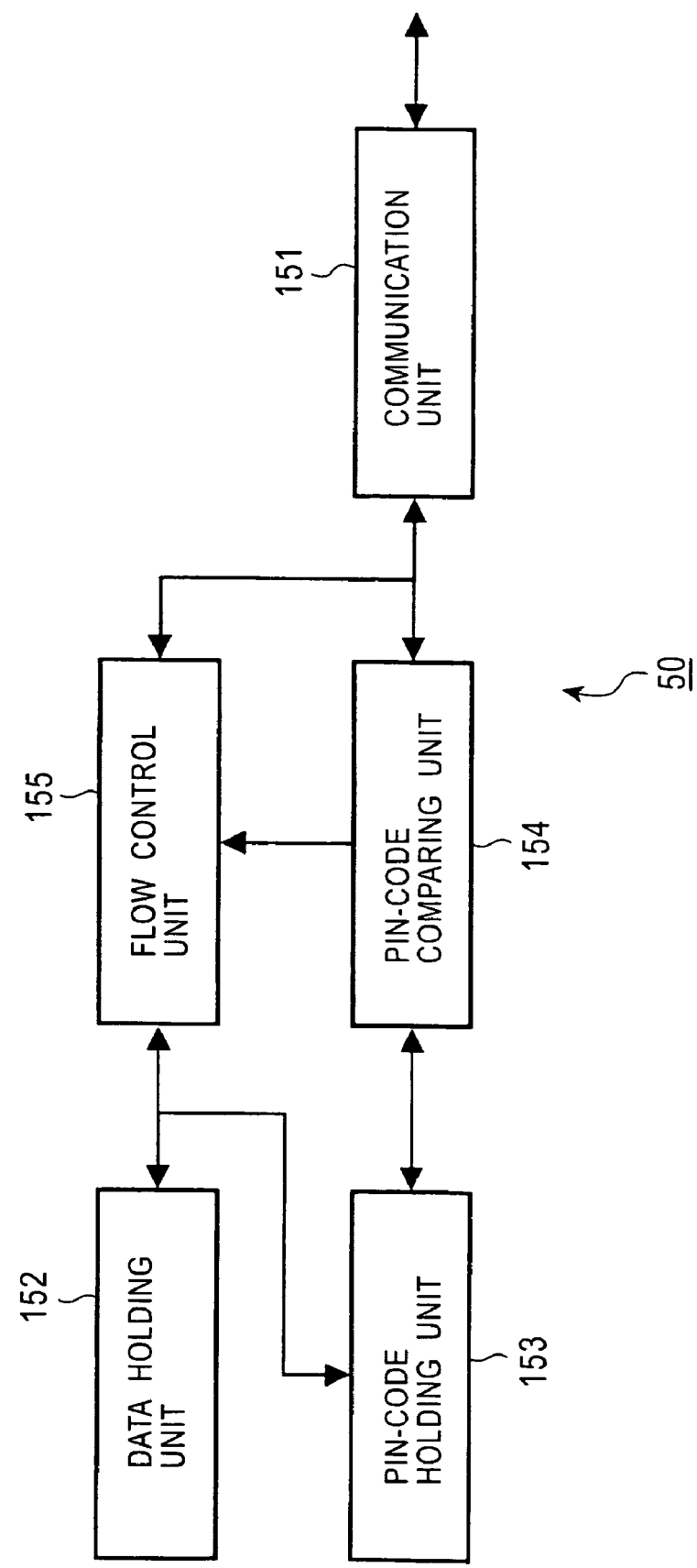
FIG. 10 schematically shows a functional structure for controlling PIN-code comparison/output in the IC card 50.

FIG. 10 schematically shows a functional structure for controlling PIN code comparison/output in the IC card 50.

As shown in the figure, the IC card 50 includes a communication unit 151 having a contactless wireless interface or the like; a data holding unit 152 for holding data such as valuable information; a PIN-code holding unit 153 for holding a PIN code for controlling access to the data holding unit 152; a PIN-code comparing unit 154 for comparing a PIN code input through the communication unit 151 with the PIN code held in the PIN-code holding unit 153; and a flow control unit 155 for controlling PIN code comparison/output in accordance with a condition for comparing PIN codes. Accordingly, the IC card 50 functions as a PIN-code identifying apparatus.

Figure 11:
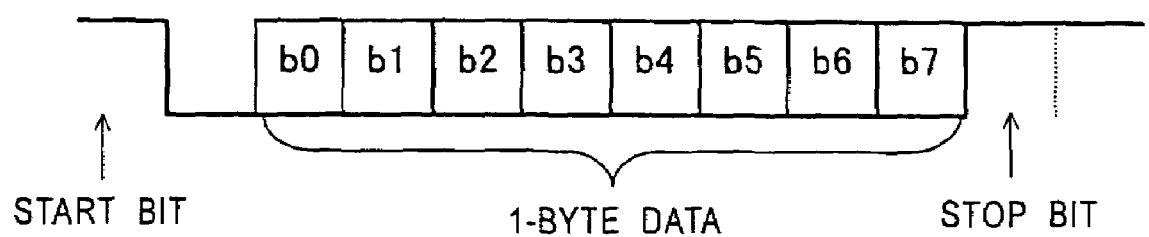
FIG. 11 schematically shows the structure of data which is transmitted/received in unit of 1 byte through a communication unit 151.

As shown in FIG. 11, data is transmitted/received in a unit of 1 byte in the communication unit 151. In FIG. 11, a start bit always exists at the head of 1-byte data. Then, 8-bit data follows, and a stop bit exists at the end. The length of each bit is predetermined by a transmitter and a receiver.

Figure 12:
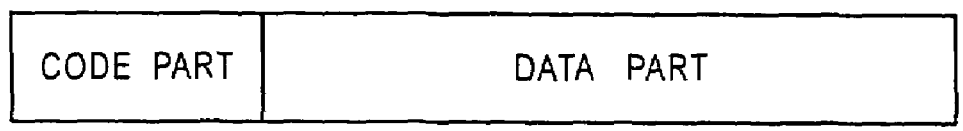
FIG. 12 schematically shows the structure of a packet including pieces of 1-byte data.

FIG. 12 schematically shows the configuration of a packet including pieces of 1-byte data. As shown in the figure, the forward part of the packet is a code part, and the latter part thereof is a data part (payload). Data indicating the meaning of the packet is described in the code part. The data part is attached when data (main data) related to the code is necessary.

Figure 13:
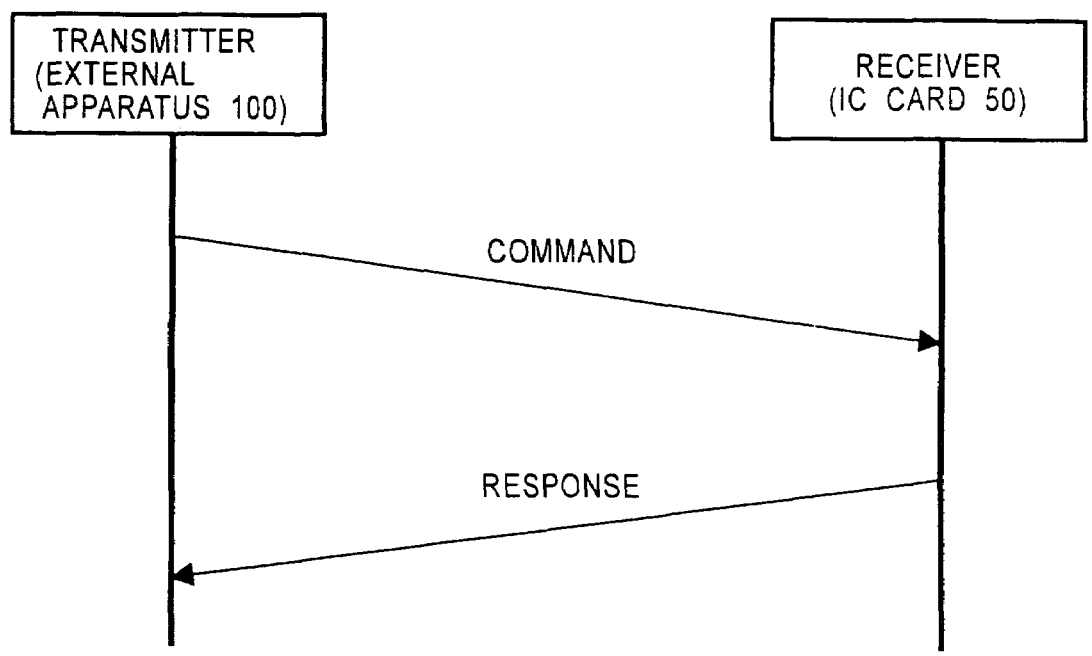
FIG. 13 shows a basic sequence of packet exchange between a transmitter and a receiver.

FIG. 13 shows a basic sequence of packet exchange between a transmitter and a receiver. In the embodiment, an external apparatus 100 is the transmitter side and the IC card 50, serving as a PIN-code identifying apparatus, is the receiver side.

The packet includes a command for requiring some action from the transmitter to the receiver and a response transmitted from the receiver to the transmitter as a result of the action corresponding to the command. Table 1 shows commands and responses used in the embodiment.

TABLE 1

| Command (external apparatus → identifying apparatus) | | Response (identifying apparatus → external apparatus) | | |
| --- | --- | --- | --- | --- |
| Code part | Data part | Code part | Data part | Meaning |
| 10h | PIN code | 12h | OK/ERROR | Input PIN code |
| 18h | PIN code | 1Ah | OK/ERROR | Change PIN code |
| 20h | Read position | 22h | OK(read data)/ERROR | Read data |
| 30h | Written data & Written position | 32h | OK/ERROR | Write data |

TABLE 1-continued

| Command (external apparatus → identifying apparatus) | | Response (identifying apparatus → external apparatus) | | Meaning |
|---|---|---|---|---|
| Code part | Data part | Code part | Data part | |
| 40h | Flag value | 42h | OK/ERROR | Change effective/ineffective |
| 50h | Flag value | 52h | OK/ERROR | Change ineffective → effective |
| 60h | Flag value | 54h | OK/ERROR | Change effective → ineffective |

"Code part 10h" of command means that a PIN code set in the data part is input to the IC card 50, which serves as a PIN-code identifying apparatus. When the communication unit 151 interprets the code part, the attached data part is transmitted to the PIN-code comparing unit 154.

The PIN-code comparing unit 154 compares the transmitted data part with the PIN code held in the PIN-code holding unit 153, and outputs "match" when the both PIN codes match. The flow control unit 155 has a function of controlling data transmission between the data holding unit 152 and the communication unit 151.

Figure 14:
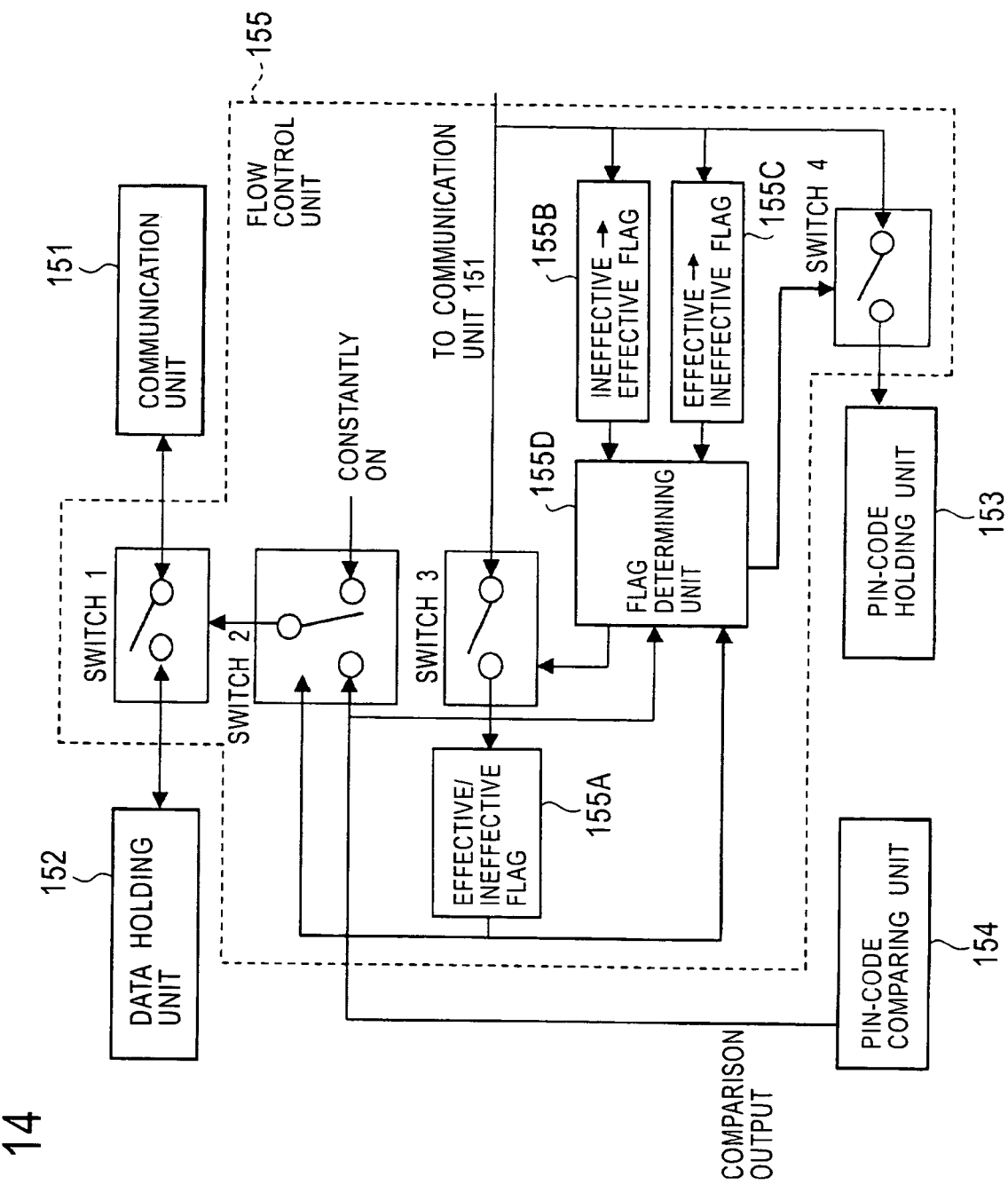
FIG. 14 shows the configuration of a flow control unit 155.

FIG. 14 shows the configuration of the flow control unit 155.

An effective/ineffective flag 155A indicates whether or not to determine whether the transmission line between the data holding unit 152 and the communication unit 151 is brought into a connected state or disconnected state in accordance with comparison/output of the PIN-code comparing unit 154.

When the effective/ineffective flag 155A is set at "1" and is on the effective side, a switch 2 is on a comparison output side. Also, when the PIN-code comparing unit 154 outputs "match", this output is transmitted to a switch 1 and the switch 1 is turned ON. Accordingly, the transmission line between the data holding unit 152 and the communication unit 151 is brought into a connected state, so that the external apparatus 100 can access the data holding unit 152 through the communication unit 151. On the other hand, when the PIN-code comparing unit 154 outputs "mismatch", this output is transmitted to the switch 1 and the switch 1 is turned OFF. Accordingly, the transmission line between the data holding unit 152 and the communication unit 151 is brought into a disconnected state, so that the external apparatus 100 cannot access the data holding unit 152 through the communication unit 151.

On the other hand, when the effective/ineffective flag 155A is set at "0" and is on the ineffective side, the switch 2 is on a "constantly ON" side. In this case, the switch 1 is constantly ON regardless of comparison output of the PIN-code comparing unit 154, so that the transmission line between the data holding unit 152 and the communication unit 151 is kept in a connected state.

It should be noted that a function of comparing PIN codes can be suppressed, that is, the PIN-code service can be voided by the effective/ineffective flag 155A when comparison of PIN codes need not be performed.

An ineffective→effective flag 155B can be changed by a command code 50h. The ineffective→effective flag 155B is used for determining whether PIN codes must be matched when the effective/ineffective flag 155A is changed from an ineffective state "0" to an effective state "1" by a command code 40h, which will be described later. That is, when the ineffective→effective flag 155B is "1", this operation is performed. When the effective/ineffective flag 155A is "0", that is, PIN code comparison is ineffective, and when the comparison output indicates "match", a switch 3 is turned ON so as to permit change of the effective/ineffective flag 155A through the communication unit 151. On the other hand, when the ineffective→effective flag 155B is "0", output of a flag determining unit 155D allows the switch 3 to be constantly ON, so as to constantly permit change of the effective/ineffective flag 155A through the communication unit 151.

When the ineffective→effective flag 155B is "1", that means PIN codes must be matched when the effective/ineffective flag 155A is changed from ineffective to effective. On the other hand, when the ineffective→effective flag 155B is "0", that means PIN codes may not be matched when the effective/ineffective flag 155A is changed from ineffective to effective.

An effective→ineffective flag 155C can be changed by a command code 60h. The effective→ineffective flag 155C is used for determining whether PIN codes must be matched when the effective/ineffective flag 155A is changed from an effective state "1" to an ineffective state "0" by a command code 40h, which will be described later. That is, when the effective→ineffective flag 155C is "1", this operation is performed. When the effective/ineffective flag 155A is "1", that is, PIN code comparison is effective, and when the comparison output indicates "match", the switch 3 is turned ON so as to permit change of the effective/ineffective flag 155A through the communication unit 151. On the other hand, when the effective→ineffective flag 155C is "0", output of the flag determining unit 155D allows the switch 3 to be constantly ON, so as to constantly permit change of the effective/ineffective flag 155A through the communication unit 151.

When the effective→ineffective flag 155C is "1", that means PIN codes must be matched when the effective/ineffective flag 155A is changed from effective to ineffective. On the other hand, when the effective→ineffective flag 155C is "0", that means PIN codes may not be matched when the effective/ineffective flag 155A is changed from effective to ineffective.

The above-described operation of controlling change of the effective/ineffective flag is performed by the flag determining unit 155D. By logically expressing this operation, output of the flag determining unit 155D can be shown as in Table 2.

TABLE 2

| | Effective/Ineffective | | | |
|---|---|---|---|---|
| | 1 Comparison output | | 0 Comparison output | |
| | Match | Mismatch | Match | Mismatch |
| Ineffective | 1 | 0 | 0 | 1 | 0 |
| → effective | 0 | 0 | 0 | 1 | 1 |
| Effective | 1 | 1 | 0 | 0 | 0 |
| → ineffective | 0 | 1 | 1 | 0 | 0 |

The command code 40h is used for changing the effective/ineffective flag 155A. The flag 155A can be changed through the communication unit 151 by the above-described operation only when the switch 3 is ON.

In this mechanism, when the state of a PIN code is changed, the PIN code need not be input in order to change the PIN code from ineffective state to effective state. However, the PIN code need be input in order to change the PIN code from effective state to ineffective state. In this way, conditions of inputting a PIN code can be set in various manners.

After the above-described operation, the data holding unit 152 and the communication unit 151 are connected when the switch 1 is turned ON. After that, the reader/writer 101 can read data from a predetermined position of the data holding unit 152 by a command code 20h and write predetermined data in the data holding unit 152 by a command code 30h.

In order to rewrite the PIN code which has already been written in the PIN-code holding unit 153, a command code 18h is used. Rewritable or not rewritable can be controlled by a switch 4.

In the example shown in FIG. 14, the flag determining unit 155D performs control in accordance with the state of each of the ineffective→effective flag 155B, the effective→ineffective flag 155C, the effective/ineffective flag 155A, and the PIN-code comparing unit 154. That is, the control condition of the switch 4 can be changed in accordance with the state of each flag. For example, the PIN code in the PIN-code holding unit 153 can be changed when the ineffective→effective flag 155B is switched from "0" to "1". Accordingly, when determination of PIN code is made effective, a new PIN code can be set regardless of the PIN code which has already been set. The setting can be changed by a simple command operation, but the security level can be increased by providing a mutual authentication unit between the communication unit 151 and the reader/writer 101.

As shown in FIGS. 3 to 5, when the memory space in the IC card 50 is expanded and a plurality of applications (service memory fields) are allocated, or when an access right is controlled by using a plurality of PIN codes, the mechanism of PIN-code comparison/output shown in FIG. 10 can be applied.

Figure 15:
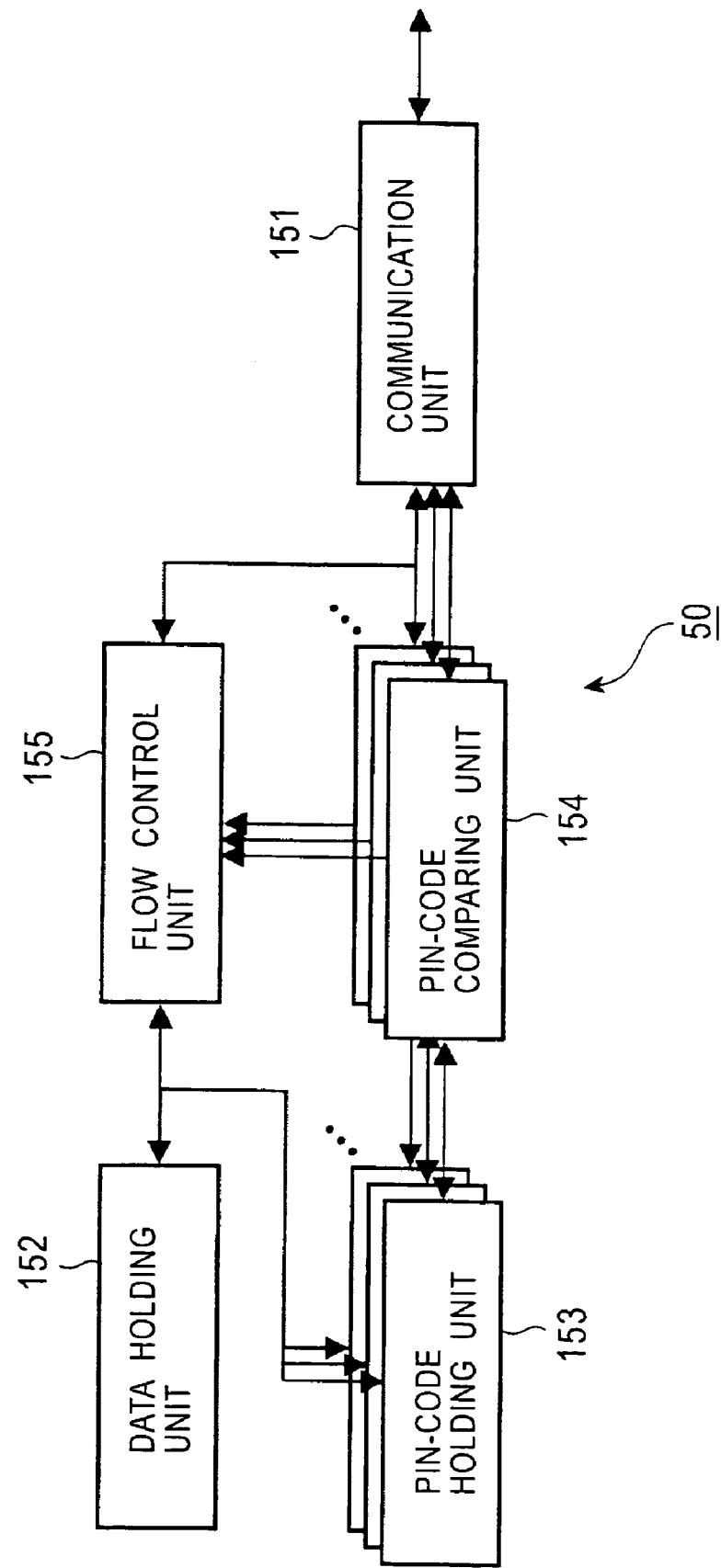
FIG. 15 shows an example of the configuration of a PIN-code identifying apparatus (IC card 50) including a plurality of PIN-code holding units and PIN-code comparing units.

FIG. 15 shows an example of the configuration of a PIN-code identifying apparatus (IC card 50) including a plurality of PIN-code holding units and PIN-code comparing units. In the example shown in FIG. 15, the data holding unit 152 and the communication unit 151 can be connected only when all the PIN-code comparing units 154 output "match". Accordingly, by allocating a part of the reader/writer 101 to which a PIN code is input to a personal user and by allocating another part of the reader/writer 101 to an administrator (for example, an administrator of the card service), a PIN code function can be controlled at the discretion of the administrator. For example, the function can be set so that a PIN code must be input regardless of user's intention.

Figure 16:
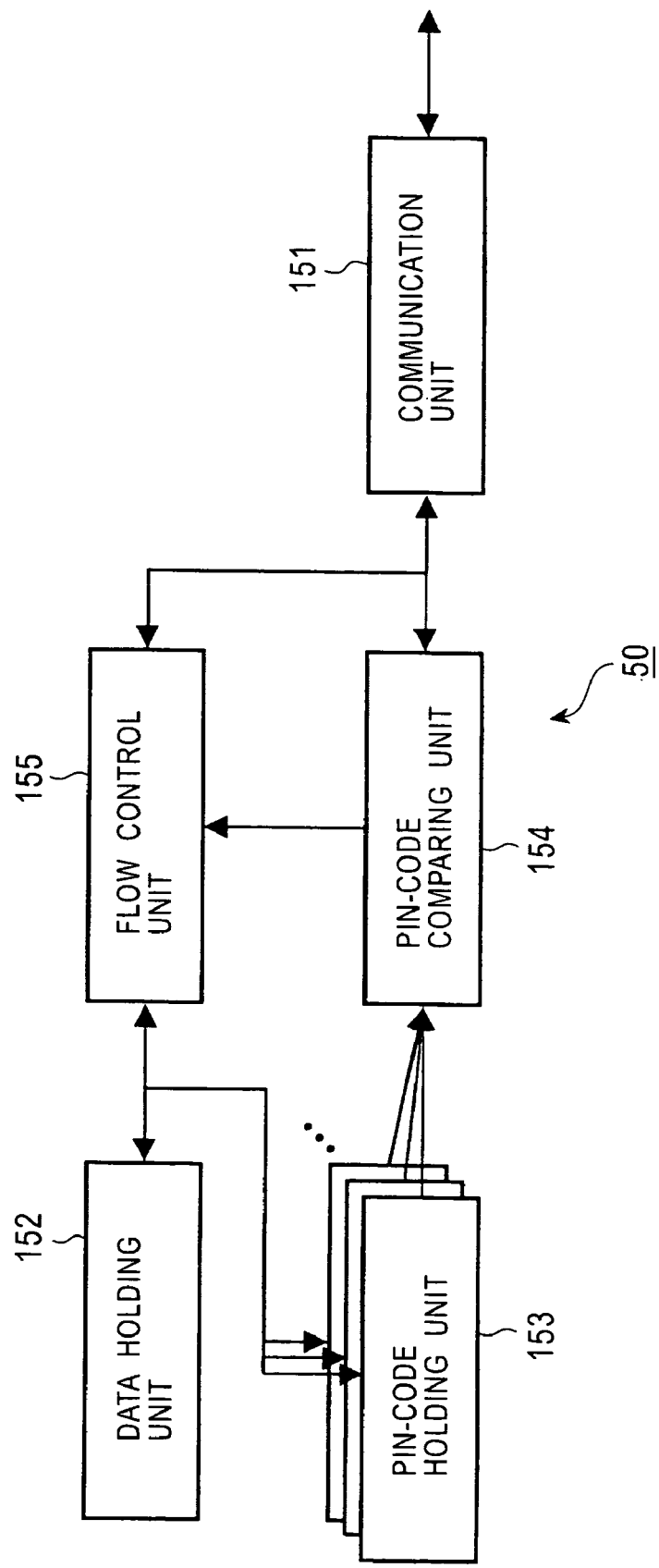
FIG. 16 shows an example of the configuration of a PIN-code identifying apparatus (IC card 50) in which a PIN code can be set to each memory field in a data holding unit 152.

FIG. 16 shows an example of the configuration of a PIN-code identifying apparatus (IC card 50) in which a PIN code can be set to each memory field in the data holding unit 152.

The PIN-code comparing unit 154 includes a lookup table showing the relationship between memory fields allocated in the data holding unit 152 and PIN codes. By using this lookup table, it can be determined whether a PIN code input through the communication unit 151 matches the PIN code of a corresponding memory field. When the PIN codes match, access to the corresponding memory field is permitted. Table 3 shows an example of the configuration of the lookup table managed in the PIN-code comparing unit 154.

TABLE 3

| PIN code | Allowable memory start address | Allowable memory end address |
|---|---|---|
| PIN code 1 | 100h | 180h |
| PIN code 2 | 300h | 3A0h |
| PIN code 3 | | |

With this configuration, a PIN code input through the communication unit 151 is compared with each PIN code held in the lookup table by the PIN-code comparing unit 154. Then, access to a memory field corresponding to the matched PIN code among the memory fields in the data holding unit 152 is permitted.

The present invention has been described in detail with reference to the specific embodiment. Apparently, those skilled in the art can realize modifications or substitutions of the embodiment without deviating from the scope of the present invention. That is, the present invention is disclosed in the form of an example, and the contents of this specification should not be interpreted in a limited manner. The attached Claims should be referred to in order to determine the scope of the present invention.

What is claimed is:

1. A data communication apparatus, comprising:
a memory space;
a service memory field in the memory space, the service memory field being comprised of one or more user blocks, each of the user blocks storing data for providing a corresponding service;
two or more service defining blocks in the memory space, each of the service defining blocks including a service definition data and an access right data which defines an access right to a corresponding user block; and
a PIN-code service definition block in the memory space for defining a PIN-code service which verifies a PIN code before the service is provided, wherein
the PIN-code service defining block includes a PIN-code service block configured to store PIN-code service data so that the PIN-code or the necessity to input the PIN-code vary from one access right to another relative to the corresponding user block, and
the one or more user blocks are accessed by using any of the corresponding two or more service defining blocks.

2. A data communication apparatus according to claim 1, further comprising an area definition block for defining an area including one or more service memory fields provided in the memory space.

3. A data communication apparatus according to claim 2, wherein the PIN-code service defining means defines a PIN-code service which verifies a PIN code before accessing the area.

4. A data communication apparatus according to claim 1, further comprising overlap-service defining means for defining another service applied to the service memory field which has already been provided by the service defining means.

5. A data communication apparatus according to claim 4, wherein the PIN-code service defining means defines a PIN-code service which verifies a PIN code before performing said overlapped another service.

6. A data communication apparatus according to claim 1, further comprising verification control means for setting verification of PIN code performed by the PIN-code service to effective or ineffective.

7. A method for managing a memory in a data communication apparatus including memory space, the method comprising:

a service defining step of defining, in the memory space, a service and a service memory field to which the service is applied, the service memory field being comprised of one or more user blocks, each of the user blocks storing data for a corresponding service;

defining an access right to two or more service defining blocks in the memory space, each of the service defining blocks including a service definition data and an access right data which defines said access right to the user blocks; and verifying a PIN code before the service is provided and via a PIN-code service definition block in the memory space for defining a PIN-code service, wherein the PIN-code service defining block includes a PIN-code service block configured to store PIN-code service data so that the PIN-code or the necessity to input the PIN-code vary from one access right to another relative to the corresponding user block, and the one or more user blocks are accessed by using any of the corresponding two or more service defining blocks.

8. A method according to claim 7, further comprising defining an area including one or more service memory fields provided in the memory space.

9. A method according to claim 8, wherein, in the PIN-code service defining step, a PIN-code service which verifies a PIN code before accessing the area is defined.

10. A method according to claim 7, further comprising an overlap-service defining step of defining another service applied to the service memory field which has already been provided in the service defining step.

11. A method according to claim 10, wherein, in the PIN-code service defining step, a PIN-code service which verifies a PIN code before performing said overlapped another service is defined.

12. A method according to claim 7, further comprising a verification control step of setting verification of PIN code performed by the PIN-code service to effective or ineffective.

* * * * *